(12) United States Patent
Mori et al.

(10) Patent No.: US 8,661,854 B2
(45) Date of Patent: Mar. 4, 2014

(54) GLASS SHEET BENDING SYSTEM AND METHOD FOR BENDING SAME

(75) Inventors: Takeshi Mori, Matsusaka (JP); Takeshi Hosokawa, Matsusaka (JP)

(73) Assignee: Central Glass Company, Limited, Ube-shi (JP)

( * ) Notice: Subject to any disclaimer, the term of this patent is extended or adjusted under 35 U.S.C. 154(b) by 0 days.

(21) Appl. No.: 13/402,497

(22) Filed: Feb. 22, 2012

(65) Prior Publication Data

US 2013/0199243 A1    Aug. 8, 2013

(30) Foreign Application Priority Data

Feb. 3, 2012  (JP) ................................. 2012-021549

(51) Int. Cl.
 *C03B 23/03*   (2006.01)
(52) U.S. Cl.
 CPC ...................................... *C03B 23/03* (2013.01)
 USPC .............................................. 65/290; 65/106
(58) Field of Classification Search
 CPC ...... C03B 23/03; C03B 25/06; C03B 23/0302
 USPC .......................................... 65/103, 106, 290
 See application file for complete search history.

(56) References Cited

U.S. PATENT DOCUMENTS

| | | | | |
|---|---|---|---|---|
| 2,191,658 A | * | 2/1940 | Haux ................................. | 65/20 |
| 4,043,782 A | * | 8/1977 | Bamford et al. ................. | 65/104 |
| 4,318,728 A | * | 3/1982 | Claassen .......................... | 65/106 |
| 4,666,496 A | * | 5/1987 | Fecik et al. ...................... | 65/273 |
| 4,865,638 A | | 9/1989 | Kudo | |
| 4,983,205 A | * | 1/1991 | Kuster et al. ..................... | 65/290 |
| 5,022,907 A | * | 6/1991 | Vanaschen et al. .............. | 65/163 |
| 5,226,942 A | * | 7/1993 | Letemps et al. ................. | 65/106 |
| 5,743,931 A | | 4/1998 | Flaugher et al. | |
| 2009/0000334 A1 | * | 1/2009 | Boisselle et al. ................ | 65/104 |
| 2011/0247367 A1 | | 10/2011 | Nitschke et al. | |

FOREIGN PATENT DOCUMENTS

| | | |
|---|---|---|
| JP | 64-14121 A | 1/1989 |
| JP | 10-236644 A | 9/1998 |
| JP | 2001-524062 A | 11/2001 |
| JP | 2002-338286 A | 11/2002 |
| JP | 2008-63059 A | 3/2008 |

OTHER PUBLICATIONS

Japanese-language Written Opinion (PCT/ISA/237) dated Mar. 26, 2013 (Five (5) pages).
International Search Report dated Mar. 26, 2013 (Six (6) pages).

* cited by examiner

*Primary Examiner* — Matthew Daniels
*Assistant Examiner* — Cynthia Szewczyk
(74) *Attorney, Agent, or Firm* — Crowell & Moring LLP

(57) ABSTRACT

Disclosed is a glass sheet bending system including a press bending station for bending a glass sheet into a desired shape. The press bending station includes a glass mounting bed on which the glass sheet is to be temporarily put until the glass sheet is pressed on the glass forming surface of a mold. This system is characterized in that the glass mounting bed includes a slat conveyer whose crawler is driven in the conveyance direction of the glass sheet or a belt conveyer whose belt is driven in the conveyance direction of the glass sheet. By this system, the glass sheet having no distortion can be produced.

10 Claims, 7 Drawing Sheets

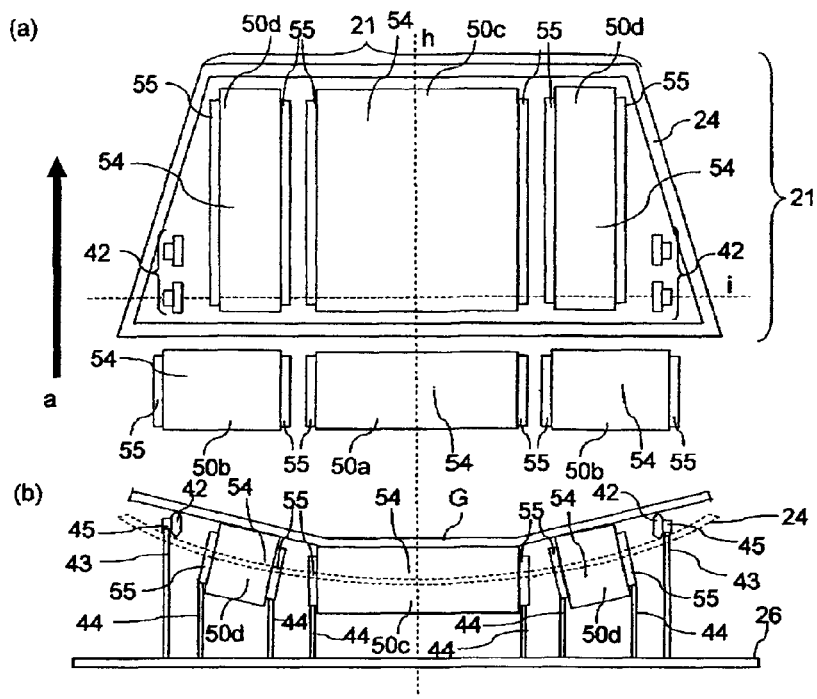
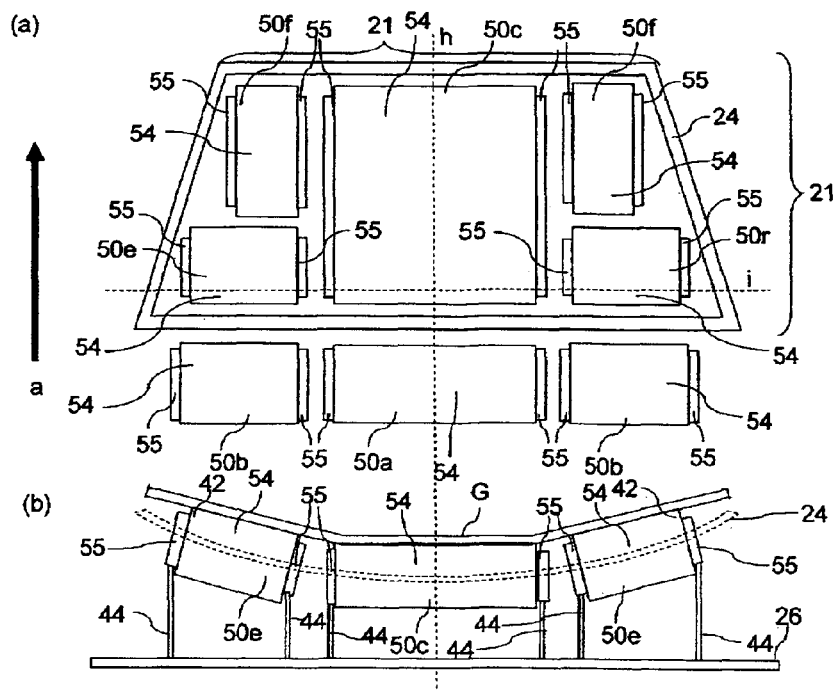

PRIOR ART

PRIOR ART

PRIOR ART

FIG.11
(a)
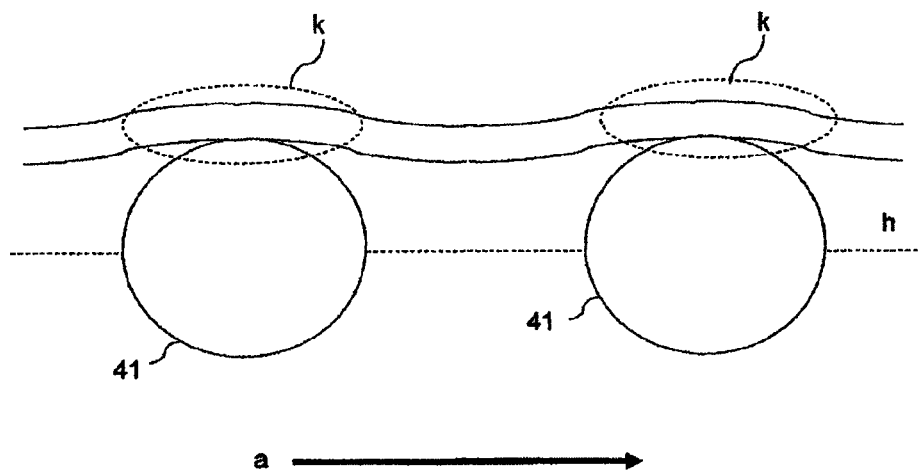
(b)
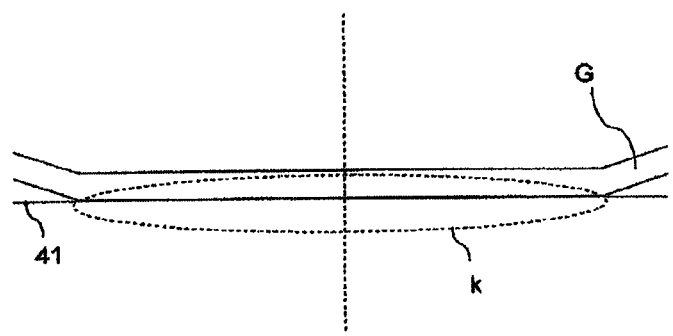
PRIOR ART

PRIOR ART

GLASS SHEET BENDING SYSTEM AND METHOD FOR BENDING SAME

TECHNICAL FIELD

This invention relates to a bending system and bending method for bending a glass sheet.

BACKGROUND OF INVENTION

Hitherto curved glass sheet having various shapes and curvatures has been used as a window glass for an automotive vehicle. Such a window glass is produced by heating a glass sheet at a temperature of 650° C. to 700° C. near a softening point in a heating furnace, and then by pressing the heated glass sheet on a glass forming surface of a mold.

As a bending system for glass sheet, the following system has been known: For example, like a conventional example as shown in FIG. 6, a flat glass sheet cast in a heating furnace 10 is heated while being conveyed by a glass conveying bed 11 constituted of a roller conveyer or the like, in which the glass sheet undergoes a preliminarily bending at a preliminarily bending station 12; Next, the glass sheet is conveyed to a position immediately below a mold 22 at a press bending station 20 outside the heating furnace, upon which the glass sheet is lifted by a press ring 24 disposed under the glass sheet so as to be pressed on a glass forming surface 23 of the mold 22, thereby allowing the glass sheet to be bent into a desired shape; Then, the bent glass sheet is conveyed to a cooling station 30 to be cooled thereby obtaining a glass sheet having a desired bending shape (see Patent Citation 1).

In the glass sheet bending system of the conventional example as shown in FIG. 6, when the glass sheet transferred from the heating furnace 10 is bent at the press bending station 20, the glass sheet is once put on a glass mounting bed 21 disposed immediately below the mold 22. The glass mounting bed 21 is constituted of a roller 40 including wide rollers 41 and narrow wheels 42, disposed inside the frame of a press ring 24 to rotate in a conveyance direction of the glass sheet as viewed from above as shown in FIG. 9.

PRIOR ART CITATIONS

Patent Citation

Patent Citation 1: United States Patent Application Publication No. US 2011/0247367 A1.

SUMMARY OF THE INVENTION

In the glass sheet bending system as shown in FIG. 6, a time distance is unavoidably made for changeover in operation between a time at which the glass sheet is put on the glass mounting bed 21 and a time at which lifting the glass sheet to the mold 22 by the press ring 24 is initiated. Since the glass sheet put on the glass mounting bed 21 has been softened upon being heated by the heating furnace, the glass sheet becomes depressed in a manner to hang down into a space between adjacent wide rollers 41 as indicated by a circle k, at locations of the glass sheet contacting with the wide rollers 41, for example, when the glass sheet is put on the wide rollers 41 of the glass mounting bed 21 as shown in FIG. 11.

There has been a problem that a depression of the glass sheet thus formed under contact of the glass sheet and the wide rollers 41 unavoidably remains after the glass sheet is bent upon being pressed on the glass forming surface 23 of the mold 22 and cooled at the cooling station 30.

This invention solves this problem. In other words, an object of this invention is to provide a bending system for glass sheet and a bending method for glass sheet, capable of forming an undistorted bent glass sheet by preventing depression from being formed in the glass sheet when the glass sheet heated in the heating furnace is put on the glass mounting bed 21 at the press bending station 20.

The present invention is a glass sheet bending system comprising: a heating furnace for heating a glass sheet to bend the glass sheet; a press bending station for bending the glass sheet heated by the heating furnace and softened, into a desired shape; and a cooling station for cooling the glass sheet bent into the desired shape at the press bending station In this glass sheet bending system, the press bending station (20) includes a glass mounting bed on which the glass sheet is to be put, a mold disposed above the glass mounting bed and having a glass forming surface at a lower surface of the mold, and a press ring 24 for lifting the glass sheet put on the glass mounting bed and pressing the glass sheet to the glass forming surface 23 of the mold 22.

Additionally, the glass mounting bed includes a slat conveyer whose crawler is driven in a conveyance direction of the glass sheet, or a belt conveyer whose belt is driven in the conveyance direction of the glass sheet. This glass sheet bending system uses the slat conveyer or the belt conveyer as the glass mounting bed, and therefore no space is formed at the contacting surface of the glass sheet with the slat conveyer or the belt conveyer when the heated glass sheet is put on the glass mounting bed dissimilarly to a case using the wide rollers like in the conventional example, so that the glass sheet can be prevented from hanging down thereby making it difficult to cause distortion in the glass sheet.

Further, the glass mounting bed may include a plurality of the slat conveyers or a plurality of the belt conveyers. The glass mounting bed is provided with a clearance corresponding to the frame shape of the press ring in order to allow the press ring to move upward and downward. Accordingly, it is required that the slat conveyer or the belt conveyer is disposed to come inside the frame shape of the press ring; however, there arises a case that a large clearance is formed within the press ring if one slat conveyer or a belt conveyer is used, because the frame shape of the press ring is usually sector-shaped. Such a clearance becomes a cause for forming distortion in the glass sheet, and therefore it is made possible to more suppress distortion formed in the glass sheet by providing the glass mounting bed with a plurality of the slat conveyers or a plurality of the belt conveyers.

Additionally, the glass mounting bed may include the slat conveyer or the belt conveyer, and a roller which is rotatable in a direction to convey the glass sheet. According to the shape of the press ring, there arises a case in which a large clearance is formed near the frame of the press ring even though the glass mounting bed includes a plurality of the slat conveyers or a plurality of belt conveyers. Accordingly, by providing the roller on which the glass sheet is to be put, within such a clearance, it becomes possible to suppress distortion formed in the glass sheet.

Additionally, the glass mounting bed may be constituted of only the slat conveyers or the combination of the slat conveyers and the rollers. In case of using the slat conveyers, meandering of the crawler on which the glass is to be put can be structurally suppressed, so that the glass can be accurately conveyed to a certain position on the press ring by the slat conveyer.

Furthermore, it is preferable that the contacting surface of the slat conveyer or the belt conveyer with the glass sheet is covered with a heat-resistant material.

When the glass sheet is bent with the glass sheet bending system according to the present invention, the following steps are carried out: the step of heating the glass sheet by the heating furnace; the step of conveying the glass sheet from the heating furnace to the press bending station and putting the glass sheet on the glass mounting bed; the step of lifting and pressing the glass sheet to the glass forming surface of the mold by the press ring; the step of sucking and attracting the glass sheet and bending the glass sheet to a shape of the glass forming surface by the mold; the step of conveying the glass sheet from the press bending station 20 to the cooling station 30; and the step of cooling the glass sheet at the cooling station, thereby making it possible to further suppress formation of distortion in the sheet glass.

Effects of Invention

This glass sheet bending system according to the present invention uses the slat conveyer or the belt conveyer as the glass mounting bed, and therefore no space is formed at the contacting surface of the glass sheet with the slat conveyer or the belt conveyer when the heated glass sheet is put on the glass mounting bed dissimilarly to the case using the wide rollers like in the conventional example, so that the glass sheet can be prevented from hanging down thereby suppressing formation of distortion in the sheet glass so as to improve a productivity.

BRIEF DESCRIPTION OF DRAWINGS

FIG. 1 shows a glass mounting bed of a glass sheet bending system according to Embodiment 1, in which a part (a) is a plan view; and a part (b) is a cross-sectional view taken along a lateral width direction;

FIG. 2 shows a glass mounting bed of a glass sheet bending system according to Embodiment 2, in which a part (a) is a plan view; and a part (b) is a cross-sectional view taken along a lateral width direction;

FIG. 11 is an illustration showing a state in which glass is distorted at its surface contacting with rollers when the glass sheet is put on the glass mounting bed of the glass sheet bending system of the conventional example, in which a part (a) is a cross-sectional view taken along the conveyance direction; and (b) is a cross-sectional view taken along a direction perpendicular to the conveyance direction.

DETAILED DESCRIPTION

<Overall Configuration of Glass Sheet Bending System According to Present Invention>

The overall configuration of a glass sheet bending system according to the present invention will be discussed with reference to the overall configuration of the conventional example shown in FIG. 6.

The glass sheet bending system according to the present invention includes a heating furnace 10, a press bending station 20 and a cooling station 30.

[Regarding the Configuration of the Heating Furnace]

Figure 6:
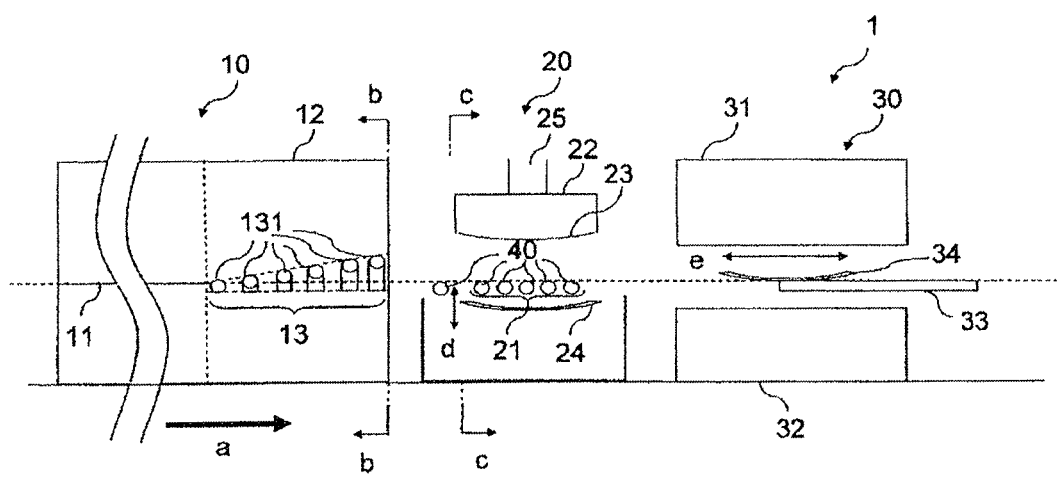
FIG. 6 is an overall view of a glass sheet bending system of a conventional example.

The hearing furnace 10 includes a region in which the glass sheet cast in the heating furnace 10 from the left side in FIG. 6 is heated at a temperature of 650° C. to 700° C. near a softening point while being conveyed to the right side in FIG. 6 by a glass conveying bed 11 constituted of a roller conveyer and/or the like, and a preliminarily bending station 12.

Figure 7:
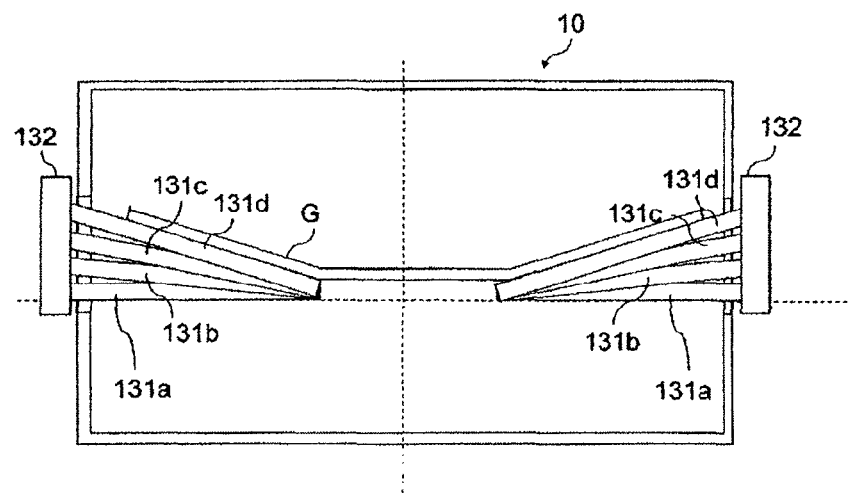
FIG. 7 is a cross-sectional view of a preliminarily bending station of a heating furnace as viewed in a direction of the heating furnace from a glass bending station, in the glass sheet bending system of the conventional example.

The preliminarily bending station 12 includes a roller conveyer 13 for preliminarily bending. Rollers 131 for preliminarily bending, constituting the preliminarily bending roller conveyer 13 are installed to each of opposite sides of the heating furnace 10 and inclined in such a manner as to lower in a direction toward the inside of the heating furnace 10, and driven by roller driving mechanisms 132 for preliminarily bending, as shown in FIG. 7 obtained as viewed from the press bending station 20 in the direction of the preliminarily bending station. Additionally, the inclination of the rollers 131 for preliminarily bending is set to become larger as a position approaches the side of the press bending station 20 from the rollers 131a, 131b, 131c, 131d for preliminarily bending and the glass conveying bed 11. Since the roller conveyer 13 is thus configured, the glass sheet heated to a temperature near the softening point in a process of being conveyed through the inside of the heating furnace 10 is gradually curved in a direction perpendicular to the conveyance direction of the glass sheet as the inclination of the roller conveyer for preliminarily bending becomes larger in a process of being conveyed by the roller conveyer 13 for preliminarily bending, so that the glass sheet G is maintained planar at its section around a central part which section has not been contacted with the preliminarily bending rollers 131a, 131b, 131c, 131d, the glass sheet G having a trapezoid in cross-section taken along a plane perpendicular to the conveyance direction, as shown in FIG. 7.

[Regarding the Configuration of the Press Bending Station]

The press bending station 20 includes a mold 22, a press ring 24 disposed below the mold 22, and a glass mounting bed 21 arranged inside the press ring 24.

The mold 22 has a glass forming surface 23 facing the side of the press ring 24. A plurality of suction openings (not shown) are formed at the glass forming surface 23 to suck the glass sheet. Additionally, the mold 22 is provided with a suction duct 25 for connecting a vacuum source device (not shown) for generating a suction force of the above sucking with the mold 22.

Figure 8:
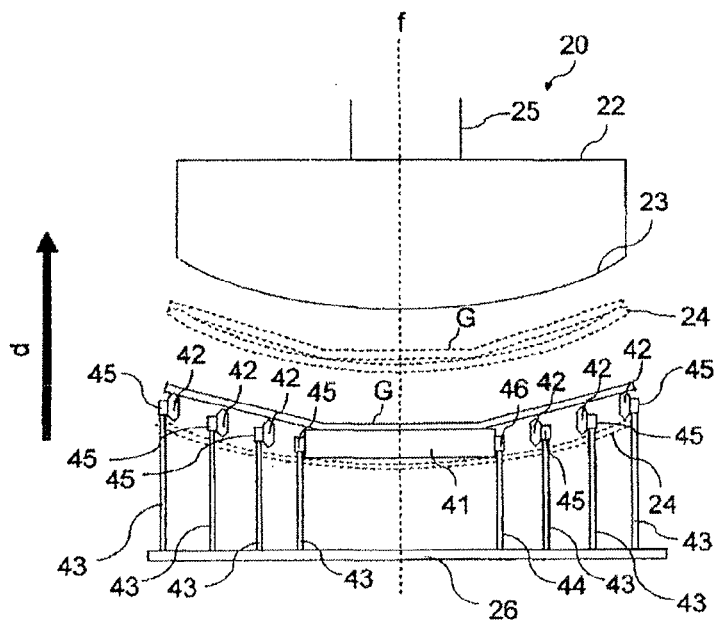
FIG. 8 is a cross-sectional view of the press bending station taken along a plane perpendicular to the conveyance direction of the glass sheet, in the glass sheet bending system of the conventional example.

The glass mounting bed 21 is arranged to have a shape corresponding to the shape of the glass sheet which has been bent in a direction perpendicular to the conveyance direction of the glass plate at the preliminarily bending station 12 as shown in FIG. 8 obtained when the press bending station 20 is taken along a plane perpendicular to the conveyance direction of the glass sheet. For example, in case that glass mounting bed 21 is constituted of the wide rollers 41 and the wheels 42 like in the conventional example, the respective heights of each of the wide rollers 41 and each of the wheels 42 are adjusted corresponding to the shape of the glass sheet which has been bent at the preliminarily bending station 12.

The press ring 24 has the same outer shape as the glass sheet which is to be bent, and is a ring having a shape corresponding to the shape of the glass sheet which has been bent at the preliminarily bending station 12 for the glass sheet. The press ring 24 can move up and down as indicated by an arrow d, so that it stands ready at a position lower than the contacting surface of the glass mounting bed 21 with the glass sheet when the glass sheet is conveyed from the preliminarily bending station 12 to the press bending station 20.

When the glass sheet is brought into contact with the glass forming surface 23 of the mold 22, the glass sheet is sucked to the suction openings formed at the glass forming surface and therefore bent corresponding to the shape of the glass forming surface 23.

The glass sheet sucked to the glass forming surface 23 of the mold 22 and bent corresponding to the shape of the glass forming surface 23 is released from suction and put on a cooling ring 34.

[Regarding the Configuration of the Cooling Station]

The cooling station 30 includes an upper cooling head 31 for applying air to the glass sheet which has been bent at the press bending station 20 so as to accomplish annealing and quenching for the glass sheet, and a lower cooling head 32 disposed vertically separate from the upper cooling head 31, and further includes a shuttle 33 which can make its reciprocating motion in a direction indicated by an arrow e in FIG. 6 to receive the glass sheet bend at the press bending station 20 and convey the glass sheet to the cooling station 30. The tip end of the shuttle 33 is provided with a cooling ring 34 which has a ring-shape corresponding to the shape of the glass sheet bent at the press bending station 20.

When the glass sheet is sucked to the glass forming surface 23 of the mold 22 of the press bending station 20, the press ring 24 moves downward and then the cooling ring 34 provided at the tip end of the shuttle 33 moves to a position immediately below the glass forming surface 23 from the cooling station 30 in place of the press ring 24.

When the glass sheet is bent corresponding to the glass forming surface 23, the glass sheet is released from suction to the glass forming surface 23 and put on the cooling ring 34. When the glass sheet is put on the cooling ring 34, the shuttle 33 returns to the position of the upper cooling head 31 and the lower cooling head 32 of the cooling station 30. Then, air is blown to the upper and lower surfaces of the glass sheet from both the upper cooling head 31 and the lower cooling head 32 thereby accomplishing the annealing or the quenching.

<Regarding Configuration of Glass Mounting Bed of Present Invention>

The glass mounting bed 21 of the present invention has, for example, a configuration as shown in FIG. 1.

A part (a) of FIG. 1 is a view of the glass mounting bed 21 as viewed from above; and a part (b) of FIG. 1 is a view of the glass mounting bed 21, taken along a broken line i indicated in the part (a) of FIG. 1.

In FIG. 1, the glass mounting bed 21 has a configuration including three slat conveyers 50 for driving crawlers 54 in a direction of an arrow a inside the frame of the press ring 24, and wheels 42 located in a clearance between the slat conveyer 50 and the inside frame of the press ring 24, as shown in the part (a) of FIG. 1.

In FIG. 1, the slat conveyer 50 includes a slat conveyer 50c disposed at the central part of the glass mounting bed, and slat conveyers 50d disposed respectively on the opposite sides of the slat conveyer 50c. As shown at (b) of FIG. 1, the slat conveyer 50 is arranged corresponding to the shape of the glass sheet G bent at the preliminarily bending station 12. The slat conveyer 50c disposed at the central part of the glass mounting bed 21 is arranged in such a manner that the contact surface thereof with the glass sheet G becomes horizontal, and the slat conveyer 50d is arranged to incline in such a manner as to correspond to the bent shape of the glass sheet G and to come into contact with the glass sheet G.

The slat conveyer 50 includes a housing 55 for covering a driving mechanism (not shown) for driving the crawler 54, and driving shaft supporting members 44 which can adjust the height or level of the slat conveyer 50. These driving shaft supporting members 44 are formed on a roller conveyer supporting rack 26.

Concerning the configuration of the glass mounting bed 21, as shown in FIG. 2, the slat conveyer 50 may be divided into two parts in the conveyance direction like the slat conveyers 50e, 50f disposed on each of the opposite sides of the slat conveyer 50c located at the central part of the glass mounting bed 21, corresponding to the ring shape of the press ring 24, in which the width of the crawler 54 of each of the divided two parts of the slat conveyer 50 corresponds to the position of each slat conveyer 50 to be disposed.

Figure 3:
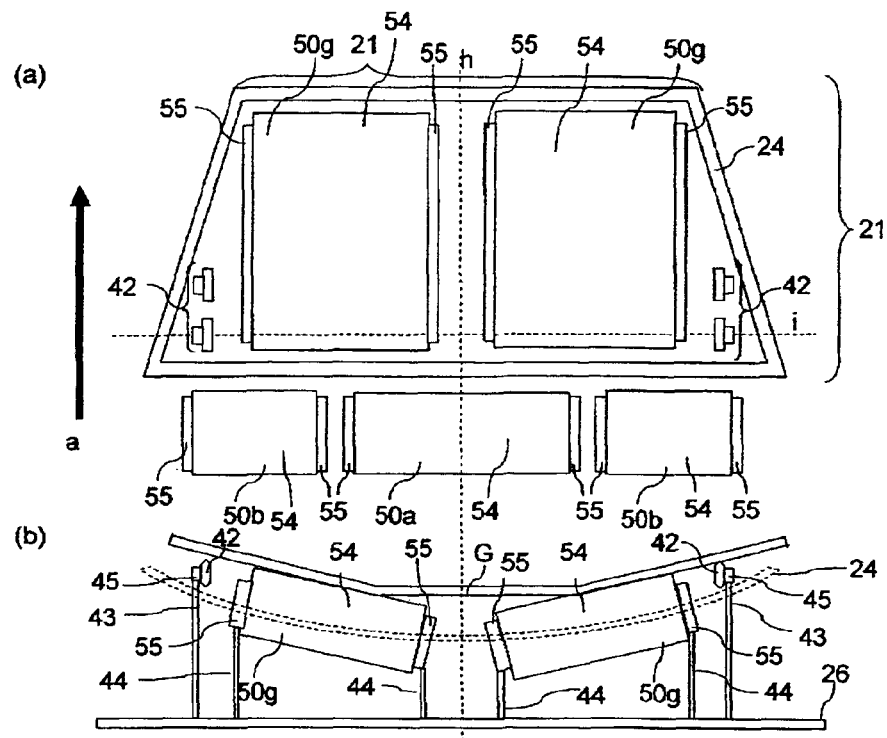
FIG. 3 shows a glass mounting bed of a glass sheet bending system according to Embodiment 3, in which a part (a) is a plan view; and a part (b) is a cross-sectional view taken along a lateral width direction.

Additionally, as shown in FIG. 3, the slat conveyer 50 may be arranged in such a manner that the contacting surface thereof with the glass sheet G inclines corresponding to the glass sheet G like a slat conveyer 50g without being arranged at the central part of the glass mounting bed 21.

Figure 9:
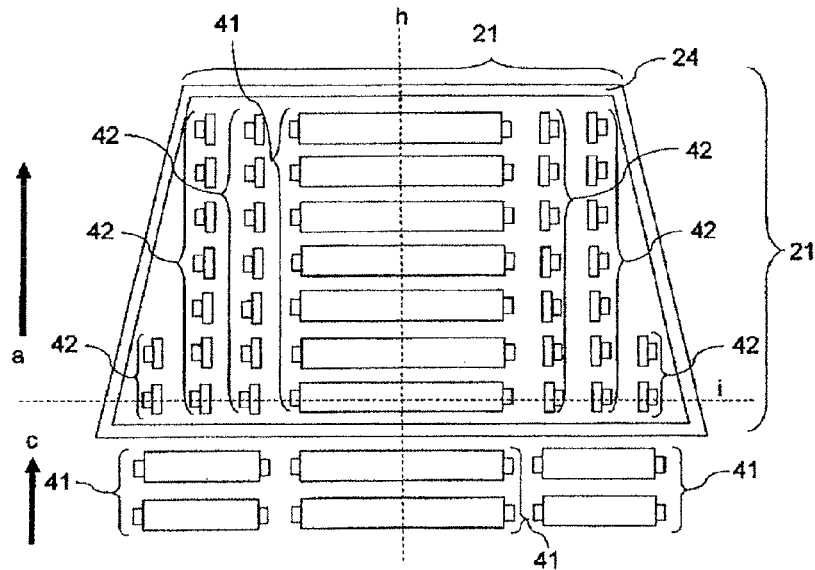
FIG. 9 is a plan view of the glass mounting bed, in the glass sheet bending system of the conventional example.

Further, in order to convey the glass sheet G from the heating furnace 10 to the glass mounting bed 21, slat conveyers 50a and slat conveyers 50b are arranged between the heating furnace 10 and the glass mounting bed. These conveyers convey the glass sheet G carried out from the heating furnace 10 to the glass mounting bed 21. In FIGS. 1 to 3, while the slat conveyers 50a, 50b are disposed between the heating furnace 10 and glass mounting bed 21, wide rollers 41 may be arranged in place of the slat conveyers as shown in FIG. 9 which is obtained when the glass mounting bed 21 of the conventional example is viewed from the above.

While only the slat conveyer 50 or the combination of the slat conveyer 50 and the wheels 42 are used for the glass mounting bed 21 in FIGS. 1 to 3, the slat conveyer 50 may be replaced with belt conveyer.

Additionally, the contacting surface of each slat conveyer 50 or each belt conveyer to be used for the glass mounting bed 21 in the present invention with the glass sheet G is preferably covered with a heat-resistant material. For example, a resinous film endurable to a heat-resistant temperature of not higher than about 650 degrees may be formed at the contacting surface of the slat conveyer or the belt conveyer with the glass sheet G; the contacting surface may be covered with a heat-resistant cloth which is woven with heat-resistant fibers such as Zylon; or the crawler 54 may be formed of a heat-resistant resin in case of using the slat conveyer 50.

<Effects Obtained by Using Slat Conveyer or Belt Conveyer as Glass Mounting Bed>

Upon enumerating problems arising when the glass mounting bed 21 is constituted of the rollers 40 such as the wide rollers 41 and the wheels 42 like in the conventional example, demonstration will be made as to how such problems are solved by constituting the glass mounting bed of the slat conveyers 50 or the belt conveyers.

Figure 10:
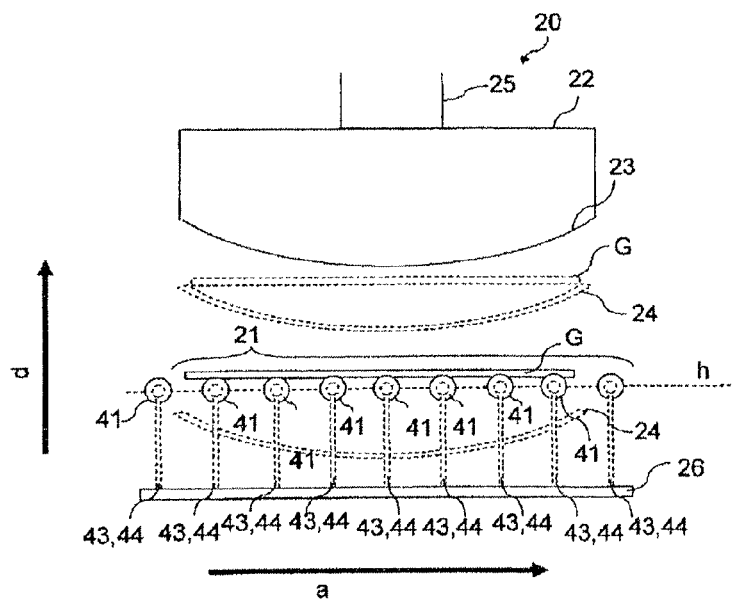
FIG. 10 is a cross-sectional view of the press bending station taken along the conveyance direction of the glass sheet, in the glass sheet bending system of the conventional example.

FIG. 10 is a cross-sectional view of the glass mounting bed 21 of the conventional example, taken at the central part of the press ring along an arrow a which is the conveyance direction of the glass sheet G. As shown in FIG. 10, the wide rollers 41 are laid side by side at the same height. This is the same not only in case of being taken at the central part but also in case of being taken at any location of the glass mounting bed, if taken along the conveyance direction. Additionally, the glass sheet G conveyed from the heating furnace 10 and put on the glass mounting bed 21 is a flat sheet in the conveyance direction as shown in FIG. 10.

The glass sheet G is in a state of being put on the glass mounting bed 21 from a time at which it is put on the glass mounting bed 21 by stopping the rotation of the wide rollers 41 to a time at which the press ring 24 moves upward to be brought into contact with the glass sheet G so as to lift the glass sheet G from the glass mounting bed 21. The time of this state is shorter than 1 second; however, the glass sheet G has been heated to a temperature near the softening point in the heating furnace so as to be softened, and therefore the glass of the glass sheet G unavoidably hangs down from a space between the adjacent rollers 41 when the glass sheet G is put on the glass mounting bed 21. Accordingly, contacting sections of the rollers 40 such as the wide rollers 41, the wheels 42 or the like with the glass sheet G is unavoidably formed with a depression extending along the axial direction of the rollers, as indicated by the circles k.

A part (a) of FIG. 11 is an enlarged view of the contacting sections of the glass sheet G of FIG. 10 with the wide rollers 41 constituting the glass mounting bed 21. As seen from this view, when the glass sheet G is put on the wide rollers 41 constituting the glass mounting bed 21, the glass sheet G has been softened because of being heated to a temperature near the softening point in the heating furnace, so that the glass unavoidably deforms along the cross-sectional shape of the rollers as indicated by the circles k at the part (a) of FIG. 11 thereby unavoidably forming a depression. A part (b) of FIG. 11 shows a state made when the curved glass sheet G is put on the wide rollers 41 constituting the glass mounting bed 21 upon being conveyed from the heating furnace, in which a section of the glass sheet G near the central part is not in contact with the preliminarily bending rollers and therefore is flat so as to be mounted on the wide roller 41 along the axial direction of the wide rollers. As a result, the depressions along in the axial direction of the wider rollers 41 are unavoidably formed as shown at the part (a) of FIG. 11 during a standby time continued until the glass sheet is lifted by the press ring.

Figure 12:
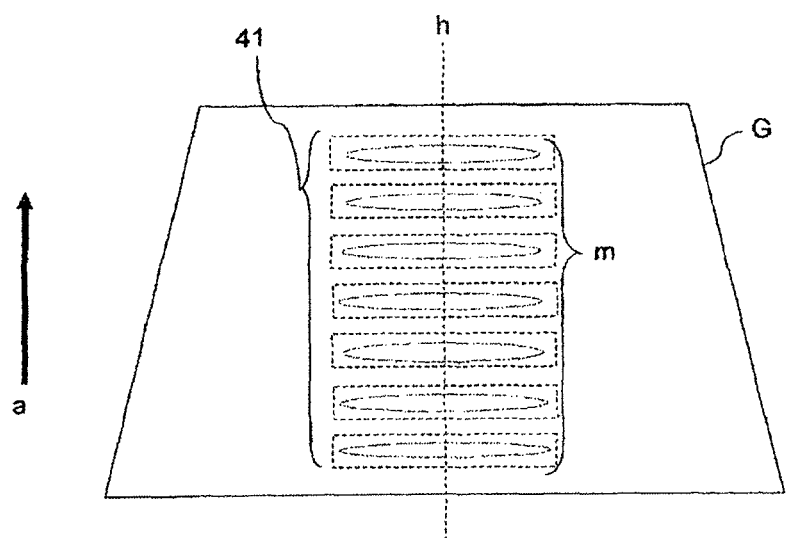
FIG. 12 is an illustration showing a state in which distortion remains at contacting surfaces of the glass sheet with the wide rollers when the glass sheet is put on the glass mounting bed of the glass sheet bending system of the conventional example.

The thus formed depressions become inconspicuous owing to glass flowage caused during the annealing if the annealing time at the cooling station is long; however, these depressions remain to form distortions in case that the annealing time is short. FIG. 12 shows an example in which distortions m unavoidably remain at locations of the glass sheet G produced by the glass bed 21 of the conventional example in contact with the wide rollers 41. In this example, the long distortions extending perpendicular to the conveyance direction of the glass sheet as indicated with m remain at the locations of the glass sheet G in contact with the wide rollers 41 as indicated by the broken lines.

In contrast, in case that the glass mounting bed 21 is constituted of the slat conveyers 50 or the belt conveyers as in the present invention, no clearance is formed in the conveyance direction of the glass sheet G dissimilarly to the case of using the roller conveyers used in the glass mounting bed 21 of the conventional example, thereby making it possible to prevent formation of distortions along the direction perpendicular to the conveyance direction of the glass sheet G. As a result, it becomes possible to produce glass sheets having no distortions even if the annealing time is shortened and to increase a number of products per unit time, as compared with a case using the glass mounting bed used in the conventional example.

In case of using the slat conveyers 50 as the glass mounting bed, it has been confirmed that no distortion remains in the glass sheet G though the annealing time becomes shorter by 4 seconds than that in case of using the wide rollers 41, thereby making it possible to accomplish a large improvement in operational efficiency.

<Arrangement of Slat Conveyer or Belt Conveyer in Glass Mounting Bed>

When the slat conveyers 50 or the belt conveyers are arranged as the glass mounting bed 21, it is preferable to dispose the slat conveyer 50 or the belt conveyer at the central part of the glass mounting bed 21 as shown in FIGS. 1 and 3. Because, the central part of the glass mounting bed 21 corresponds to the central part of the glass sheet G, and therefore it is not preferable that the distortions of the glass sheet comes into sight of a driver particularly in case of using the glass sheet G as a front windshield glass if the distortions remain at the central part of the glass sheet G.

<Configuration of Slat Conveyer as Glass Mounting Bed>

Figure 4:
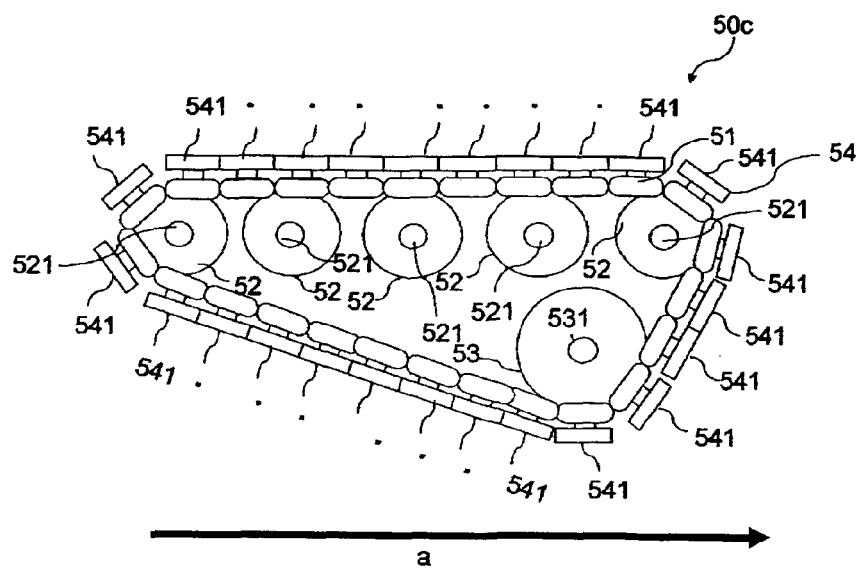
FIG. 4 is a cross-sectional view of a slat conveyer in Embodiment 1, taken along a conveyance direction of a glass sheet.
Figure 5:
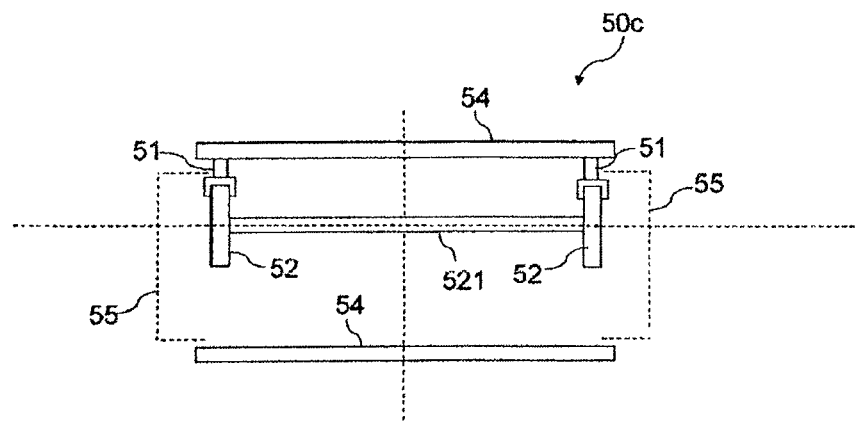
FIG. 5 is a cross-sectional view of the slat conveyer in Embodiment 1, taken along a lateral width direction.

The configuration of the slat conveyer 50 used as the glass mounting bed 21 is, for example, shown in FIGS. 4 and 5. FIG. 4 is a cross-sectional view of the slat conveyer 50c shown in FIG. 1, taken in the direction of the arrow a or the conveyance direction of the glass sheet; and FIG. 5 is a cross-sectional view of the slat conveyer 50c shown in FIG. 1, taken along a plane perpendicular to the direction of the arrow a or the conveyance direction.

Like the slat conveyer 50c in FIG. 5, the slat conveyer 50 is provided with two lines of chains 51 each of which has an attachment which chains are respectively located at the opposite sides of the crawler 54 which includes a plurality of long crawler members 541 each of which extends in the direction perpendicular to the conveyance direction of the glass sheet G, in which the crawler 54 and the chain 51 having the attachment are connected with each other by the attachment of the chain having the attachment. Each of the two lines of the chains 51 having the attachments is engaged with a sprocket 52 for chain conveyance and a sprocket 53 for chain driving, and therefore a stable driving can be made.

Additionally, a driving force is given to the sprocket 53 for chain driving through a driving mechanism (not shown).

When such a slat conveyer 50 is used as the glass mounting bed 21, the chain 51 having the attachment is engaged with the sprocket 52 for chain conveyance and with the sprocket 53 for chain driving, and therefore no slipping is made so that it is easily accomplished to accurately locate the glass sheet G conveyed from the heating furnace 10, at the upper part of the press ring 24, as compared with a case in which the belt conveyers are used as the glass mounting bed 21.

Additionally, in the slat conveyer 50, there arises a case that the tension of the chain 51 having the attachment is lowered to slack the chain owing to elongation of the chain 51 having the attachment and/or wear of gears of the sprocket 52 for chain conveyance and the sprocket 53 for chain driving.

Therefore, the connection between the chain 51 having the attachment and the crawler 54 allows for play between the chain having the attachment and the crawler so that the contacting surface of the crawler 54 with the glass sheet G can follow the shape of the glass sheet G under the weight of the glass sheet G when the glass sheet G is put on the slat conveyer 50.

Embodiments

Hereinafter, examples of the glass mounting bed 21 used in the press bending station of the glass sheet bending system 1 according to the present invention will be illustrated.

Embodiment 1

[Configuration of the Glass Mounting Bed]

FIG. 1 is a view showing the glass mounting bed 21 used in the press bending station 20 of the glass sheet bending system according to Embodiment 1 of the present invention.

The part (a) of FIG. 1 is a view of the glass mounting bed 21 according to Embodiment 1 as viewed from above; and the part (b) of FIG. 1 is a cross-sectional view of the glass mounting bed 21 according to Embodiment 1 taken along a broken line i indicated at the part (a) of FIG. 1.

As shown at the part (a) of FIG. 1, the glass mounting bed 21 according to Embodiment 1 has a configuration including the three slat conveyers 50 for driving the crawlers 54 in the direction of the arrow a inside the frame of the press ring 24, and the wheels 42 located in the clearance between the slat conveyer 50 and the inside frame of the press ring 24.

As shown in FIG. 1, in the glass mounting bed 21 according to Embodiment 1, the slat conveyer 50 includes the slat conveyer 50c disposed at the central part of the glass mounting bed, and the slat conveyers 50d disposed respectively on the opposite sides of the slat conveyer 50c. As shown at the part (b) of FIG. 1, the slat conveyer 50 is disposed corresponding to the shape of the glass sheet G bent at the preliminarily bending station 12. The slat conveyer 50c disposed at the central part of the glass mounting bed 21 is disposed in such a manner that the contact surface thereof with the glass sheet G becomes horizontal, and the slat conveyer 50d is disposed to incline in such a manner as to correspond to the bent shape of the glass sheet G and to come into contact with the glass sheet G.

The slat conveyer 50 includes a housing 55 for covering the driving mechanism (not shown) for driving the crawler 54, a driving mechanism (not shown) for driving the sprocket 53 for chain driving, and the driving shaft supporting members 44 which can adjust the heights of the slat conveyers 50.

[Configuration of the Slat Conveyer]

The configuration of the slat conveyer 50 used as the glass mounting bed 21 according to Embodiment 1 is shown in FIGS. 4 and 5. FIG. 4 is a cross-sectional view of the slat conveyer 50c shown in FIG. 1, taken in the direction of the arrow a or the conveyance direction of the glass sheet; and FIG. 5 is a cross-sectional view of the slat conveyer 50c shown in FIG. 1, taken along a plane perpendicular to the direction of the arrow a or the conveyance direction.

Like the slat conveyer 50c in FIG. 5, the slat conveyer 50 is provided with two lines of the chains 51 each of which has the attachment which chains are respectively located at the opposite sides of the crawler 54 which includes a plurality of the long crawler members 541 each of which extends in the direction perpendicular to the conveyance direction of the glass sheet G, in which the crawler 54 and the chain 51 having the attachment are connected with each other by the attachment of the chain having the attachment. Each of the two lines of the chains 51 having the attachments are engaged with the sprocket 52 for chain conveyance and the sprocket 53 for chain driving.

Additionally, a driving force is given to the sprocket 53 for chain driving through a driving mechanism (not shown).

By using such a slat conveyer 50 as the glass mounting bed, the chain 51 having the attachment is engaged with the sprocket 52 for chain conveyance and with the sprocket 53 for chain driving, and therefore no slipping is made so that it is easily accomplished to accurately locate the glass sheet G conveyed from the heating furnace 10, at the upper part of the press ring 24.

Additionally, in the slat conveyer 50, there arises a case that the tension of the chain 51 having the attachment is lowered to slack the chain owing to elongation of the chain 51 having the attachment and/or wear of gears of the sprocket 52 for chain conveyance and the sprocket 53 for chain driving. Therefore, the connection between the chain 51 having the attachment and the crawler 54 allows for play between the chain having the attachment and the crawler so that the contacting surface of the crawler 54 with the glass sheet G can follow the shape of the glass sheet G under the weight of the glass sheet G when the glass sheet G is put on the slat conveyer 50.

Additionally, the crawler members 541 constituting the crawler 54 are respectively covered with a cloth woven with Zylon which is heat-resistant fiber having a heat-resisting temperature of 650° C., and therefore the crawler members 541 cannot be damaged even if the glass sheet G heated to a temperature near the softening temperature in the heating furnace 10 is put on the crawler members by a time of about 1 second.

With the glass sheet bending system according to Embodiment 1, by using such a glass mounting bed 21, a curved glass having no distortion except for a part of the glass sheet G contacting with the wheels 42 could be produced.

The glass sheet G produced by the glass sheet bending system according to Embodiment 1 has no distortion at its central part, and therefore it cannot block a driver's view even in case of being used as a front windshield glass of a vehicle so as to be able to be sufficiently used as a front windshield glass.

Embodiment 2

[Configuration of the Glass Mounting Bed]

FIG. 2 is a view showing the glass mounting bed 21 used in the press bending station 20 of the glass sheet bending system according to Embodiment 2 of the present invention.

A part (a) of FIG. 2 is a view of the glass mounting bed 21 according to Embodiment 1 as viewed from above; and a part (b) of FIG. 2 is a cross-sectional view of the glass mounting bed 21 according to Embodiment 1 taken along a broken line i indicated at the part (a) of FIG. 2.

As shown at the part (a) of FIG. 2, the glass mounting bed 21 according to Embodiment 2 has a configuration including five slat conveyers 50 for driving crawlers 54 in the direction of the arrow a inside the frame of the press ring 24.

As shown in FIG. 2, the glass mounting bed 21 according to Embodiment 2 is similar to that of Embodiment 1 in such a point that the slat conveyer 50c of the slat conveyer 50 is disposed at the central part of the glass mounting bed; however, the combination of the slat conveyer 50e and the slat conveyer 50f and the combination of the slat conveyer 50e and the slat conveyer 50f are respectively disposed at the opposite sides of the slat conveyer 50c, in which the width of the slat conveyer 50*e* in a direction perpendicular to the direction of the arrow a or the conveyance direction of the glass sheet G is larger than the width of the slat conveyer 50*f* in the direction perpendicular to the direction of the arrow a.

Thus, by arranging the two slat conveyers in the direction of the arrow a on each of the opposite sides of the slat conveyer 50*c* disposed at the central part of the glass mounting bed 21, an arrangement can be flexibly made corresponding to the shape of the frame, so that the glass mounting bed 21 is configured without using the wheels 42 dissimilarly to the glass mounting bed 21 of Embodiment 1.

The configuration of the slat conveyer 50 is the same as that of the slat conveyer 50 used in Embodiment 1, and therefore explanation thereof will be omitted here.

With the glass sheet bending system according to Embodiment 2, by using such a glass mounting bed, a glass sheet having no distortion could be produced.

The glass sheet G produced by the glass sheet bending system according to Embodiment 1 has no distortion, and therefore it cannot block a driver's view even in case of being used as a front windshield glass of a vehicle so as to be able to be sufficiently used as a front windshield glass.

Embodiment 3

[Configuration of the Glass Mounting Bed]

FIG. 3 is a view showing the glass mounting bed 21 used in the press bending station 20 of the glass sheet bending system according to Embodiment 3 of the present invention.

A part (a) of FIG. 3 is a view of the glass mounting bed 21 according to Embodiment 2 as viewed from above; and a part (b) of FIG. 3 is a cross-sectional view of the glass mounting bed 21 according to Embodiment 3 taken along a broken line i indicated at the part (a) of FIG. 3.

As shown at the part (a) of FIG. 3, the glass mounting bed 21 according to Embodiment 3 has a configuration including two slat conveyers 50 for driving crawlers 54 in the direction of the arrow a inside the frame of the press ring 24, and wheels 42 located in the clearance between the slat conveyer 50 and the inside frame of the press ring 24.

As shown in FIG. 3, in the glass mounting bed 21 according to Embodiment 3, the slat conveyer 50 is constituted of a pair of wide slat conveyers 50*g* which are disposed on the opposite sides of the center line h of the glass mounting bed. As shown at a part (b) of FIG. 3, the pair of slat conveyers 50*g* are disposed corresponding to the shape of the glass sheet G which has been bent at the preliminarily bending station 12, in which the slat conveyers are disposed in such a manner that their contacting surfaces with the glass sheet G are inclined corresponding to the bent shape of the glass sheet G.

The configuration of the slat conveyer 50 is the same as that of the slat conveyer 50 used in Embodiment 1, and therefore explanation thereof will be omitted.

With the glass sheet bending system according to Embodiment 3, by using such a glass mounting bed 21, a curved glass having no distortion except for a part of the glass sheet G contacting with the wheels 42 could be produced.

The glass sheet G produced by the glass sheet bending system according to Embodiment 3 has no distortion at its central part, and therefore it cannot block a driver's view even in case of being used as a front windshield glass of a vehicle so as to be able to be sufficiently used as a front windshield glass.

While preferable modes for carrying out the present invention have been discussed, the present invention is not limited to them and therefore a variety of applications may be expected.

EXPLANATION OF REFERENCE NUMERAL

1 glass sheet bending system
10 heating furnace
11 glass conveying bed
12 preliminarily bending station
13 roller conveyer for preliminarily bending
131 roller for preliminarily bending
131*a* roller for preliminarily bending
131*b* roller for preliminarily bending
131*c* roller for preliminarily bending
131*d* roller for preliminarily bending
132 roller driving mechanism for preliminarily bending
20 press bending station
21 glass mounting bed
22 mold
23 glass forming surface
24 press ring
25 suction duct
26 roller conveyer supporting rack
30 cooling station
31 upper cooling head
32 lower cooling head
33 shuttle
34 cooling ring
40 roller
41 wide roller
42 wheel
43 driving force transmission mechanism
44 driving shaft supporting member
45 coupling
46 bearing
50 slat conveyer
50*a* slat conveyer
50*b* slat conveyer
50*c* slat conveyer
50*d* slat conveyer
50*e* slat conveyer
50*f* slat conveyer
50*g* slat conveyer
51 chain having attachment
52 sprocket for chain conveyance
521 sprocket shaft for chain conveyance
53 sprocket for chain driving
531 sprocket shaft for chain driving
54 crawler
541 crawler member
55 housing
G glass sheet
a conveyance direction of glass
b direction in which heating furnace is viewed from press forming station
c direction in which press forming station is viewed from heating furnace
d direction in which press ring on which glass is put is operated
e direction in which shuttle is operated
f center line in lateral width direction of press forming station
h center line of glass mounting bed
k circle surrounding depression formed by putting glass sheet on glass mounting bed
m distortion formed when glass sheet is put on glass mounting bed constituted of wide rollers

The invention claimed is:

1. A glass sheet bending system comprising:
    a heating furnace (10) for heating a glass sheet to bend the glass sheet;
    a press bending station for bending the glass sheet heated by the heating furnace (10) and softened, into a desired shape; and
    a cooling station for cooling the glass sheet bent into the desired shape at the press bending station;
    wherein the press bending station (20) includes
    a glass mounting bed (21) on which the glass sheet is to be put,
    a mold (22) disposed above the glass mounting bed (21) and having a glass forming surface (23) at a lower surface of the mold, and
    a press ring (24) for lifting the glass sheet put on the glass mounting bed (21) and pressing the glass sheet to the glass forming surface (23) of the mold (22),
    characterized in that the glass mounting bed (21) includes a slat conveyer (50c, 50d, 50e, 50f, 50g) whose crawler (54) is driven in a conveyance direction of the glass sheet, or a belt conveyer whose belt is driven in the conveyance direction of the glass sheet, and
    that the slat conveyer (50c, 50d, 50e, 50f, 50g) or the belt conveyer of the glass mounting bed (21) has a length in the conveyance direction that is shorter than a width of the press ring (24) in the conveyance direction.

2. A glass sheet bending system as claimed in claim 1, characterized in that the glass mounting bed (21) includes a plurality of the slat conveyers (50c, 50d, 50e, 50f, 50g) or a plurality of the belt conveyers.

3. A glass sheet bending system as claimed in claim 1, characterized in that the glass mounting bed (21) includes the slat conveyer (50c, 50d, 50e, 50f, 50g) or the belt conveyer, and a roller (41, 42) which is rotatable in a direction to convey the glass sheet.

4. A glass sheet bending system as claimed in claim 1, characterized in that the slat conveyer or the belt conveyer has a contacting surface with the glass sheet, the contacting surface being covered with a heat-resistant material.

5. A method of bending a glass sheet by the glass sheet bending system as claimed in claim 1, comprising:
    the step of heating the glass sheet by the heating furnace (10);
    the step of conveying the glass sheet from the heating furnace (10) to the press bending station (20) and putting the glass sheet on the glass mounting bed;
    the step of lifting and pressing the glass sheet to the glass forming surface (23) of the mold (22) by the press ring (24);
    the step of sucking and attracting the glass sheet and bending the glass sheet to a shape of the glass forming surface (23) by the mold (22);
    the step of conveying the glass sheet from the press bending station (20) to the cooling station (30); and
    the step of cooling the glass sheet at the cooling station.

6. A glass sheet bending system as claimed in claim 1, wherein the glass sheet is divided in the conveyance direction into two peripheral minor portions and a central major portion sandwiched between the two peripheral minor portions, and wherein the slat conveyer (50c, 50d, 50g) of the glass mounting bed (21) has a top flat surface for directly supporting an entirety of the central major portion of the glass sheet.

7. A glass sheet bending system as claimed in claim 1, wherein the slat conveyer of the glass mounting bed (21) comprises a plurality of slat conveyers (50d, 50c and 50d; 50e, 50c and 50e; 50g and 50g) in a transverse direction relative to the conveyance direction, and wherein a first slat conveyer (50d, 50e, 50g) of the slat conveyers, which is opposite to a bent portion of the glass sheet, is inclined such that the bent portion of the glass sheet is directly supported on a top flat surface of the first slat conveyer (50d, 50e, 50g) by a surface contact therebetween.

8. A glass sheet bending system comprising:
    a heating furnace (10) for heating a glass sheet to bend the glass sheet;
    a press bending station for bending the glass sheet heated by the heating furnace (10), into a desired shape; and
    a cooling station for cooling the glass sheet bent into the desired shape at the press bending station;
    wherein the press bending station (20) includes
    a glass mounting bed (21) on which the glass sheet is to be put,
    a mold (22) disposed above the glass mounting bed (21) and having a glass forming surface (23) at a lower surface of the mold, and
    a press ring (24) for lifting the glass sheet put on the glass mounting bed (21) and pressing the glass sheet to the glass forming surface (23) of the mold (22),
    characterized in that the glass mounting bed (21) includes a slat conveyer (50c, 50d, 50e, 50f, 50g) whose crawler (54) is driven in a conveyance direction of the glass sheet, and,
    that the slat conveyer (50c, 50d, 50e, 50f, 50g) or the belt conveyer of the glass mounting bed (21) has a length in the conveyance direction that is shorter than a width of the press ring (24) in the conveyance direction.

9. A glass sheet bending system as claimed in claim 8, wherein the glass sheet is divided in the conveyance direction into two peripheral minor portions and a central major portion sandwiched between the two peripheral minor portions, and wherein the slat conveyer (50c, 50d, 50g) of the glass mounting bed (21) has a top flat surface for directly supporting an entirety of the central major portion of the glass sheet.

10. A glass sheet bending system as claimed in claim 8, wherein the slat conveyer of the glass mounting bed (21) comprises a plurality of slat conveyers (50d, 50c and 50d; 50e, 50c and 50e; 50g and 50g) in a transverse direction relative to the conveyance direction, and wherein a first slat conveyer (50d, 50e, 50g) of the slat conveyers, which is opposite to a bent portion of the glass sheet, is inclined such that the bent portion of the glass sheet is directly supported on a top flat surface of the first slat conveyer (50d, 50e, 50g) by a surface contact therebetween.

* * * * *